3,114,766
PREPARATION OF HALF-ESTERS OF
ALIPHATIC DIOLS
Robert J. Knopf, St. Albans, and Louis F. Theiling, Jr., Charleston, W. Va., assignors to Union Carbide Corporation, a corporation of New York
No Drawing. Filed Aug. 31, 1961, Ser. No. 135,153
10 Claims. (Cl. 260—486)

This invention relates to a novel process for the preparation of carboxylic acid half-esters of aliphatic diols. In one aspect, this invention relates to a process for producing half-esters of substituted and unsubstituted 1,3-propanediols by a crossed-disproportionation of a beta-hydroxyaldehyde with an aliphatic aldehyde.

According to accepted prior art procedures, it has been customary to prepare carboxylic acid half-esters of diols by conventional esterification techniques. Additionally, half-esters have also been prepared by ester exchange reactions as well as by the catalyzed disproportionation of aldehydes. However, each of the aforementioned procedures suffers from one or more disadvantages which detract from their use in commercial processing. In the direct esterification, for instance, an acid and a diol are heated together in the presence of a mineral acid or Lewis acid catalyst. While this procedure is entirely satisfactory for the production of the majority of diesters, it possesses limited utility in the preparation of the half-esters. In the case where the diol starting material is unsymmetrical, the predominent esterification may not occur at the desired hydroxyl group. Furthermore, the conventionally-produced monohydroxy esters of unsymmetrical diols are not pure products, but rather are mixtures of two isomers which, for the most part, are inseparable by commercially feasible methods. Moreover, the half-ester reaction product is invariably contaminated with unreacted diol and diesterified material, which, together with the presence of the acid catalyst, necessitates neutralization, filtration, and purification of the desired half-ester product. In the preparation of half-esters by an ester exchange reaction, similar disadvantages are encountered.

Finally, the preparation of glycol half-esters by the Tischenko reaction which involves the aluminum alkoxide-catalyzed crossed-disproportionation of an aldehyde with an aldol, is likewise not entirely satisfactory. Low reaction temperatures and strictly anhydrous conditions are required to effect the reaction successfully. Moreover, at the conclusion of the reaction the aluminum alkoxide catalyst must be decomposed with aqueous acid and the residue extracted, distilled or treated in order to achieve maximum product recovery. Thus, each of the aforesaid conventional processes exhibits numerous disadvantages in the preparation of half-esters of aliphatic diols.

It is therefore an object of the present invention to provide a novel process for the preparation of half-esters of 1,3-propanediols. Another object of this invention is to provide a process for producing half-esters of substituted and unsubstituted 1,3-propanediols by a crossed-disproportionation of a beta-hydroxyaldehyde with an aliphatic aldehyde. A further object is to provide a process for the prepartion of half-esters of 1,3-propanediols which largely eliminates contamination problems previously encountered in the reaction product. A still further object of the present invention is to provide a novel process, the entire sequence of which can be effected in a single reaction zone without the need for material transfer or a multiplicity of processing steps. Another object of this invention is to provide a non-catalytic process for the preparation of half-esters of 1,3-propanediols. These and other objects will readily become apparent to this skilled in the art in the light of the teachings herein set forth.

In accordance with the process of the instant invention it has been found that monohydroxy esters can be conveniently produced in high yields by the non-catalytic crossed-disproportionation of a beta-hydroxyaldehyde with a second aliphatic aldehyde. The following reaction illustrates the novel process of this invention:

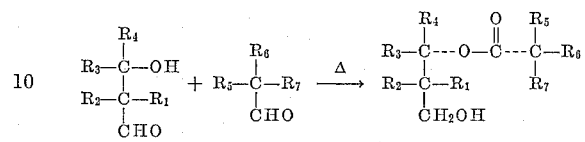

wherein $R_1$–$R_7$ are as hereinafter defined. In each instance, the beta-hydroxyaldehyde becomes the alcohol moiety of the half-ester and the aliphatic aldehyde becomes the acid moiety.

Suitable beta-hydroxyaldehydes which can be utilized in the process of this invention include the hydroxyacetaldehyde derivatives of the following formula:

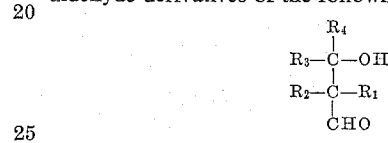

wherein $R_1$–$R_4$ may be hydrogen, alkyl, alkenyl, cycloalkyl, cycloalkenyl, aryl, aralkyl, alkaryl, hydroxyl, hydroxyalkyl, halo, haloalkyl, dialkylamine, cyano, heterocyclic, and the like. Moreover, the R's need not be the same throughout the molecule. In some instances, $R_3$ and $R_4$ can form part of the same cycloaliphatic ring system. Preferred beta-hydroxyaldehydes are those wherein each of the R groups contains from 1 to 10 carbon atoms and still more preferably from 1 to 6 carbon atoms. Illustrative beta-hydroxyaldehydes which are useful in the practice of the instant invention include, among others, 3-hydroxypropionaldehyde, 2-methyl-3-hydroxypropionaldehyde, 2,2-dimethyl - 3 - hydroxypropionaldehyde, 2-methyl - 2 - ethyl-3-hydroxypropionaldehyde, 2-ethyl-2-butyl - 3 - hydroxypropionaldehyde, 2-butyl-2(3-butenyl)-3-hydroxypropionaldehyde, 3-methyl - 3 - hydroxybutyraldehyde, 2-methyl - 2 - hydroxymethylpentaldehyde, 3-cyclohexyl - 3 - hydroxybutyraldehyde, 2(1-hydroxycyclohexyl) acetaldehyde, 2(3-cyclohexenyl) - 3 - hydroxypropionaldehyde, 2-methyl - 2 - propyl-3-hydroxypropionaldehyde, 3-hydroxyvaleraldehyde, 2,2-dimethyl - 3 - hydroxyenanthaldehyde, 2-methyl - 2 - ethyl-3-hydroxycaprylaldehyde, 3-hydroxytridecanoaldehyde, and the like.

Aldehydes suitable for use in cross-disproportionation with the aforesaid beta-hydroxyaldehydes include formaldehyde, and derivatives of acetaldehyde of the formula:

wherein $R_5$–$R_7$ may be hydrogen, alkyl, alkenyl, alkynyl, cycloalkyl, cycloalkenyl, aryl, aralkyl, alkaryl, hydroxyl, hydroxyalkyl, halo, haloalkyl, dialkylamino, cyano, heterocyclic, and the like, with the provision that any olefinic or acetylenic unsaturation can not be present in the alpha, beta position with respect to the aldehydic carbonyl group. As indicated for the beta-hydroxyaldehydes, the R's need not be the same throughout the molecules. Preferred aldehydes are those wherein each of the R groups contains from 1 to 10 carbon atoms and more preferably from 1 to 6 carbon atoms. Typical aldehydes include formaldehyde, acetaldehyde, trimethylacetaldehyde, propionaldehyde, n-butyraldehyde, isobutyraldehyde, n-valeraldehyde, n-caproaldehyde, n-heptaldehyde, dodecaldehyde, 2,2-dimethylpropionaldehyde, 2-methyl - 2 -ethylpropionaldehyde, 3-cyclohexylbutyraldehyde, 2-methyl - 4 -phenylbutyraldehyde, and the like. The aromatic aldehydes and aliphatic aldehydes having alpha, beta-unsaturation do not undergo the crossed-disproportionation reaction.

In a preferred embodiment of the present invention, the beta-hydroxyaldehyde and the aliphatic aldehyde are charged to an agitated reaction vessel and heated at a temperature and for a period of time sufficient to effect the cross-disproportionation. Although the temperature employed will largely be determined by the thermal stability of the particular beta-hydroxyaldehyde, in general, a temperature range of from about 90° C. to about 200° C. has been found satisfactory. Temperatures above and below the aforesaid range can also be employed but are less preferred.

The period during which the reactants are heated will, of course, be dependent upon the particular temperature employed. However, for most practical purposes the crossed-disproportionation reaction can be effected within from about 2 to about 20 hours.

Inasmuch as the desired crossed-disproportionation reaction is promoted by the presence of an excess of the aliphatic aldehyde, it is preferred to employ a mole ratio of aliphatic aldehyde to beta-hydroxyaldehyde of from about 2:1 to about 4:1. However, the mole ratio can vary from 1:1 to 10:1, and higher. Thus, in lieu of charging all the reactants to the vessel at the same time, the aliphatic aldehyde can be added to the reaction vessel, heated to the desired temperature, and then the beta-hydroxyaldehyde can be introduced gradually over a period of time.

In practice, it is desirable to conduct the reaction in a suitable inert atmosphere and at a pressure sufficient to maintain the reactants in the liquid phase. While nitrogen is ideally suited for use in the instant process, other inert gases can also be employed.

After the reactants have been heated for a period of time sufficient to effect the crossed-disproportionation reaction, the crude mixture is charged to a still kettle and refined by fractional distillation techniques.

The high molecular weight monohydroxyesters of substituted or unsubstituted 1,3-propanediols obtained by the above process are of particular interest as starting materials for the production of plasticizers, lubricants, surface-active agents, and the like. Due to the fact that esters derived from 2,2-dialkyl - 1,3 - propanedioles exhibit outstanding thermal stability characteristics, these compositions are uniquely suited for use in the plasticizer and lubricant fields. Moreover, the instant invention provides a novel route for the preparation of diols or acids which contain reactive functional groups. By the instant process, esters can be prepared under relatively mild conditions and thereafter saponified to the acid and diol which can be readily separated by neutralization and steam-distillation.

By the term "crossed-disproportionation" as employed in the specification and appended claims, is meant a reaction wherein a beta-hydroxyaldehyde and an aliphatic aldehyde are condensed to a single ester molecule in which the beta-hydroxyaldehyde becomes the alcohol portion of the ester and the aliphatic aldehyde becomes the acid portion.

The term "aliphatic" as used herein, is employed merely to indicate that the carbonyl group of the aldehyde is attached to a carbon atom which itself is not part of an aromatic ring system. Thus, the aldehyde can be unsubstituted, or substituted with the various aromatic or heterocyclic substituents hereinbefore indicated.

The following examples are illustrative:

*Example I*

A 500-milliliter glass kettle equipped with a stirrer, reflux condenser, feed tank, and an inlet tube for nitrogen, was charged with 200 grams (2.0 moles) of 2-ethylbutyraldehyde. The contents of the kettle were refluxed at atmospheric pressure under a blanket of nitrogen while 116 grams (1.0 mole) of 2-methyl-2-ethyl-3-hydroxypropionaldehyde were added dropwise over a period of about 1.5 hours. Following the feed period the mixture was held at reflux for an additional 8.0 hours. During this period the kettle temperature was from 130° to 135° C. Thereafter, the kettle contents were fractionally distilled on a packed column of about 12 theoretical plates. In this manner there was obtained 69 grams of the $C_{11}$ glycol half-ester 2-hydroxymethyl-2-methylbutyl 2-ethylbutyrate having a boiling range of from 106° to 113° C. at a pressure of 3 millimeters of mercury. In addition, there were recovered 94 grams of 2-ethylbutyraldehyde and 26 grams of the aldol. Moreover, 33 grams of the ester-diol 2-hydroxymethyl-2-methylbutyl 2-hydroxymethyl-2-methylbutyrate were co-produced by self-disproportionation of the aldol. The product $C_{11}$ ester analyzed at 101.3 percent purity by standard methods of saponification with aqueous potassium hydroxide. Saponification of the ester followed by neutralization and steam distillation afforded 2-ethylbutyric acid in the theoretical quantity. Similarly, distillation of the steaming residue afforded the theoretical quantity of 2-methyl-2-ethyl-1,3-propanediol.

*Example II*

To a one-liter glass kettle equipped with a stirrer, reflux condenser, feed tank and nitrogen gas inlet tube were charged 300 grams (3.0 moles) of 2-methylpentaldehyde. The charge was then heated to reflux at atmospheric pressure in a nitrogen atmosphere while 116 grams (1.0 mole) of 2-methyl-2-ethyl-3-hydroxypropionaldehyde were introduced over a period of 2.0 hours. Following completion of the feed period, the reaction mixture was held at reflux temperature for an additional 6.0 hours. The charge was then fractionally distilled at reduced pressure to give 96 grams of the $C_{12}$ glycol half-ester 2-hydroxymethyl-2-methylbutyl 2-methylpentanoate boiling at 130–137° C. at a pressure of 10 millimeters of mercury. In addition, there were recovered 229 grams of 2-methylpentaldehyde and 36 grams of the aldol.

*Example III*

To a one-liter glass kettle equipped with a stirrer, reflux condenser and a nitrogen inlet tube was charged a mixture of 203 grams (1.99 moles) of 2,2-dimethyl-3-hydroxypropionaldehyde and 196 grams (2.33 moles) of 4-pentenal. The mixture was refluxed for 4.6 hours in a nitrogen atmosphere, the temperature rising from 109° C. initially to 117° C. at the conslusion. Fractional distillation of the reaction mixture afforded 74 grams of the glycol half-ester 2-hydroxymethyl-2-methylpropyl penten-4-oate, boiling from 110–121° C. at a pressure of 10 millimeters of mercury and analyzing for a purity of 101.2 percent by saponification. In addition, there were recovered 157 grams of 4-pentenal and 96 grams of aldol, while the still residue (approximately 70 grams) consisted principally of the ester-diol 2-hydroxymethyl-2-methylpropyl 2-hydroxymethyl-2-methylpropionate, formed via self-disproportionation of the aldol starter.

*Example IV*

To a one-liter glass kettle equipped with a stirrer, reflux condenser and nitrogen inlet was charged a mixture of 85 grams (0.65 mole) of 2-methyl-2-propyl-3-hydroxypropionaldehyde and 168 grams (1.95 moles) of n-pentaldehyde (valeraldehyde). The mixture was refluxed for 9.0 hours at atmospheric pressure in the presence of a nitrogen blanket, the kettle temperature rising from 100° C. at the start to 110° C. at the finish of the heating period. Fractional distillation of the charge afforded 58 grams of the $C_{12}$ glycol half-ester 2-hydroxymethyl-2-methylpentyl pentanoate, boiling from 141–142° C. at a pressure of 5 millimeters of mercury and analyzing for a purity of 99.9 percent by saponification. In addition, there were recovered 86 grams of valeraldehyde and 31 grams of the aldol starter, plus a trace of $C_{14}$ ester-diol resulting from self-disproportionation of the aldol. Saponification of the glycol ester followed by neutralization and steam distillation afforded valeric acid in almost the theoretical quantity. Reduced pressure distillation of the residue from the steam distillation afforded, as expected, 2-methyl-2-propyl-1,3-propanediol.

*Example V*

To a one-liter glass kettle equipped with a stirrer, reflux condenser, and nitrogen inlet tube was charged a mixture of 225 grams (2.25 moles) of 2-ethylbutyraldehyde and 108 grams (0.75 mole) of refined n-butyraldol. The mixture was heated in a nitrogen atmosphere for 21 hours at a temperature of 113–119° C. and subsequently distilled at reduced pressure with the aid of a simple Vigreaux column. In this manner there were obtained 94 grams of the $C_{14}$ glycol ester boiling from 97–123° C. at a pressure of 0.3–2.0 millimeters of mercury. In addition, there were recovered 169 grams of 2-ethylbutyraldehyde, 15 grams of n-butyraldol, and 13 grams of 2-ethyl-3-propyl-acrolein (from dehydration of n-butyraldol). Only a trace of a higher-boiling ester was obtained as a tails fraction.

*Example VI*

To a 300-milliliter stainless steel rocker bomb was charged a mixture of 81 grams (0.625 mole) of 2-hydroxymethyl-2-methylpentaldehyde and 108 grams (1.25 moles) of trimethylacetaldehyde. The mixture was heated with rocking action for a total of 7 hours at 140° C., 118 pounds per square inch gauge pressure being developed in the bomb. Upon fractional distillation of the mixture through a small Vigreaux column there were obtained 76 grams of the $C_{12}$ glycol ester 2-hydroxymethyl-2-methylpentyl trimethylacetate boiling from 97–123° C. at a pressure of 1–4 millimeters of mercury. The indicated purity by saponification was 100.7 percent. In addition to the glycol-ester, there were recovered 81 grams of trimethylacetaldehyde, 5 grams of the aldol, and 17 grams of the ester-diol formed via self-disproportionation of the aldol.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A non-catalytic process for the preparation of the half-ester of an aliphatic diol of the formula:

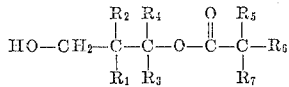

wherein $R_1$–$R_7$ are selected from the group consisting of hydrogen, and alkyl, alkenyl, cycloalkyl and phenyl of from 1 to 10 carbon atoms; which comprises forming a mixture of a beta-hydroxyaldehyde and an aliphatic aldehyde which is free from alpha, beta-unsaturation, said aldehydes of the respective formulae:

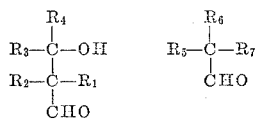

wherein $R_1$–$R_7$ are as indicated above; heating said mixture to a temperature sufficient to cause cross-disproportionation of said beta-hydroxyaldehyde with said aliphatic aldehyde; and thereafter recovering said half-ester.

2. The process of claim 1 wherein said mixture is heated in an inert atmosphere at a temperature of from about 90° to about 200° C.

3. The process of claim 1 wherein said aldehydes are present in a mole ratio of aliphatic aldehyde to beta-hydroxyaldehyde of from about 1:1 to about 10:1.

4. The process of claim 2 wherein said aldehydes are present in a mole ratio of aliphatic aldehyde to beta-hydroxyaldehyde of from about 2:1 to about 4:1.

5. A non-catalytic process for the preparation of 2-hydroxymethyl-2-methylbutyl 2-ethylbutyrate which comprises forming a mixture of 2-ethylbutyraldehyde and 2-methyl-2-ethyl-3-hydroxypropionaldehyde in a respective mole ratio of from about 2:1 to about 4:1; heating said mixture in an inert atmosphere at a temperature of from about 90° to about 200° C.; and thereafter recovering said 2-hydroxymethyl-2-methylbutyl 2-ethylbutyrate.

6. A non-catalytic process for the preparation of 2-hydroxymethyl-2-methylbutyl 2-methylpentanoate which comprises forming a mixture of 2-methylpentaldehyde and 2-methyl-2-ethyl-3-hydroxypropionaldehyde in a respective mole ratio of from about 2:1 to about 4:1; heating said mixture in an inert atmosphere at a temperature of from about 90° to about 200° C.; and thereafter recovering said 2-hydroxymethyl-2-methylbutyl 2-methylpentanoate.

7. A non-catalytic process for the preparation of 2-hydroxymethyl-2-methylpropyl penten-4-oate which comprises forming a mixture of 4-pentenal and 2,2-dimethyl-3-hydroxypropionaldehyde in a respective mole ratio of from about 2:1 to about 4:1; heating said mixture in an inert atmosphere at a temperature of from about 90° to about 200° C.; and thereafter recovering said 2-hydroxymethyl-2-methylpropyl penten-4-oate.

8. A non-catalytic process for the preparation of 2-hydroxymethyl-2-methylpentyl pentanoate which comprises forming a mixture of n-pentaldehyde and 2-methyl-2-propyl-3-hydroxypropionaldehyde in a respective mole ratio of from about 2:1 to about 4:1; heating said mixture in an inert atmosphere at a temperature of from about 90° to about 200° C.; and thereafter recovering said 2-hydroxymethyl-2-methylpentyl pentanoate.

9. A non-catalytic process for the preparation of 2-hydroxymethyl-1-propylbutyl-2-ethylbutyrate which comprises forming a mixture of 2-ethylbutyraldehyde and n-butyraldol in a respective mole ratio of from about 2:1 to about 4:1; heating said mixture in an inert atmosphere at a temperature of from about 90° to about 200° C.; and thereafter recovering said 2-hydroxymethyl-1-propylbutyl-2-ethylbutyrate.

10. A non-catalytic process for the preparation of 2-hydroxymethyl-2-methylpentyl trimethylacetate which comprises forming a mixture of trimethylacetaldehyde and 2-hydroxymethyl-2-methylpentaldehyde in a respective mole ratio of from about 2:1 to about 4:1; heating said mixture in an inert atmosphere at a temperature of from about 90° to about 200° C.; and thereafter recovering said 2-hydroxymethyl-2-methylpentyl trimethylacetate.

No references cited.